United States Patent [19]
Gruett et al.

[11] Patent Number: 5,961,299
[45] Date of Patent: Oct. 5, 1999

[54] FLUID INJECTOR PUMP WITH INTERCHANGEABLE RESERVOIR

[75] Inventors: Donald G. Gruett, Manitowoc; Scott Wright, Pewaukee, both of Wis.

[73] Assignee: Oil-Rite Corporation, Manitowoc, Wis.

[21] Appl. No.: 08/876,784

[22] Filed: Jun. 16, 1997

[51] Int. Cl.[6] ............................................. F04B 35/00
[52] U.S. Cl. ........................... 417/392; 417/200; 417/501; 184/55.2; 184/7.4
[58] Field of Search ................................. 417/200, 392, 417/399, 443, 470, 570, 501; 184/39, 39.1, 42, 55.1, 55.2, 7.4

[56] References Cited

U.S. PATENT DOCUMENTS

| | | | |
|---|---|---|---|
| 454,613 | 6/1891 | Downie et al. . | |
| 1,442,488 | 1/1923 | MacGregor . | |
| 1,587,609 | 6/1926 | Simpson . | |
| 1,965,038 | 7/1934 | Hartman . | |
| 3,131,786 | 5/1964 | Gleason et al. . | |
| 3,182,750 | 5/1965 | Gleason et al. . | |
| 3,206,175 | 9/1965 | Boteler | 184/55.2 |
| 3,485,180 | 12/1969 | Wickenberg et al. . | |
| 3,544,239 | 12/1970 | Graham . | |
| 3,731,763 | 5/1973 | Thrasher, Jr. et al. | 184/7 |
| 3,955,647 | 5/1976 | Tine et al. . | |
| 3,982,609 | 9/1976 | Bouplon . | |
| 4,094,383 | 6/1978 | Thrasher, Jr. . | |
| 4,096,924 | 6/1978 | Lyden . | |
| 4,125,176 | 11/1978 | Thrasher | 184/39.1 |
| 4,174,767 | 11/1979 | Kramer . | |
| 4,291,785 | 9/1981 | Matysak . | |
| 4,345,668 | 8/1982 | Gaunt . | |
| 4,394,944 | 7/1983 | Rech | 222/553 |
| 4,450,938 | 5/1984 | Davenport et al. . | |
| 4,721,186 | 1/1988 | Fujiwara | 184/55.1 |
| 4,784,578 | 11/1988 | Gruett . | |
| 4,784,584 | 11/1988 | Gruett . | |
| 4,807,721 | 2/1989 | Fujiwara . | |
| 4,955,953 | 9/1990 | Kayser . | |
| 4,975,028 | 12/1990 | Schultz . | |
| 5,002,156 | 3/1991 | Gaunt . | |
| 5,253,984 | 10/1993 | Gruett et al. . | |
| 5,299,917 | 4/1994 | Schultz . | |
| 5,338,166 | 8/1994 | Schutlz . | |
| 5,443,370 | 8/1995 | Wang . | |
| 5,638,920 | 6/1997 | Gruett | 184/55.2 |
| 5,725,071 | 3/1998 | Brice | 186/39.1 |

FOREIGN PATENT DOCUMENTS

615710   1/1949   United Kingdom .

*Primary Examiner*—Timothy S. Thorpe
*Assistant Examiner*—Cheryl J. Tyler
*Attorney, Agent, or Firm*—Godfrey & Kahn, S.C.

[57] ABSTRACT

A pneumatically-operated pump is provided that includes a body having a central bore with a liquid chamber for a slidable piston injector, a chamber for a removable reservoir, and an inlet and outlet for a gas. A priming conduit carries liquid from the reservoir mounted on the body to the injector in the liquid chamber which injects the liquid into a liquid line coupled to a fitting on the pump. The liquid line carries lubricant or other liquid from the pump (e.g., air tool lubricator) to an air tool or other article. A priming pump is mounted on the body and is capable of delivering a predetermined amount of liquid from the reservoir to the liquid chamber. The priming pump is used to fill the liquid line with liquid.

25 Claims, 8 Drawing Sheets

FIG_1

FIG. 2A   FIG. 2B

FIG_2C

FIG_2D

FIG. 3

FIG_7

5,961,299

FLUID INJECTOR PUMP WITH INTERCHANGEABLE RESERVOIR

FIELD OF THE INVENTION

The present invention relates to devices that are used to precisely meter a liquid. More particularly, the invention relates to a pneumatically-activated pump that can meter a precise volume of liquid such as a lubricant and that can be used in a variety of lubrication applications.

BACKGROUND OF THE INVENTION

Pneumatically-activated pumps are known and used for metering a desired amount of a lubricant or other fluid from a source to a tool or machine. One type of pneumatically-activated pump is an air tool lubricator that is used to deliver precise amounts of a lubricant, typically an oil, to an air tool. The air tool lubricator is coupled to an air line upstream from the air tool and senses air flow when the tool is cycled, whereupon the lubricator injects a precise volume of lubricant into the airline. The air stream in the air line then carries the lubricant to the air tool. An example of such an air tool lubricator is found in U.S. Pat. No. 4,450,938 (Davenport). The device disclosed therein has a single ball check design that deposits oil directly into the air line.

In other lubricators, such as the Servo Meters™ lubricator (Master Pneumatic-Detroit, Inc.), air pressure on a piston pushes a metering pin into a bored hole a preset distance which forces the lubricant through a check valve and into a lubricant line. A ball check valve is used at the air tool so that the lubricant line remains filled with lubricant. A drawback of these lubricators is a tendency to entrap air within the device which reduces their precision.

While the above-mentioned, prior-art devices are functional, they are not completely satisfactory. In particular, presently available pumps can deliver either too little or too much lubricant to a desired location or device. In addition, presently available devices are undesirable because they require the use of a pre-filled lubricant line. Lubricant lines are problematic because they must be carefully filled in order to avoid introducing air bubbles into them. Further, lubricant lines may also leak when not in use, for example, when lines are shipped from the factory to the end user.

In addition to the problems associated with lubricant lines, available pumps are not as useful and adaptable as they could be because of present reservoir design. Typically, lubricant pumps are coupled to reservoirs that hold a desired amount of lubricant for delivery to the pump. Most commonly, the reservoir is separated from the lubricant pump and a conduit, tube, or other connector is used to transport the lubricant from the reservoir to the pump.

More recently, pumps have been designed with a reservoir directly coupled to the body of the pump. One example of a pump having an integral reservoir is shown in Applicant's pending application Ser. No. 08/514,967, which is hereby incorporated by reference herein. Integrally combining the pump and reservoir permits a priming mechanism to be designed into the pump for purposes of pre-filling the lubricant line. However, the pump, reservoir and priming mechanism shown in Applicant's co-pending application are not ideal for all situations. First, the pump is relatively complex and requires numerous components including several valves for controlling air and liquid flow. Second, the reservoir is directly coupled to the pump and, thus, its size and capacity cannot be changed. While this is not a problem in many instances, there are some situations where it would be desirable to use the same lubricant pump in different applications, some of which meter a relatively high volume of lubricant and others which meter a relatively low volume of lubricant. In high volume applications, a reservoir may be rapidly depleted of lubricant and require frequent refilling. In low volume applications, the lubricant may be used too slowly, allowing the lubricant to eventually become degraded over time. Thus, different sized and designed reservoirs will be useful with lubricant pumps.

Another disadvantage of presently designed pumps with integrally attached reservoirs is that maintenance and cleaning of the pumps is difficult in that the reservoir often has to be completely disassembled in order to conduct maintenance and cleaning tasks.

Thus, it would be desirable to have a pneumatically-activated pump that employs a reservoir for containing liquid that can be easily filled with liquid prior to or after being attached to the pump, and can be readily removed from the pump after use or interchanged with a second reservoir containing a different volume and, perhaps, different types of liquid. It would also be useful to have a pneumatically-activated pump with a simplified design that eliminates multiple air and fluid passages and the accompanying valves for controlling air and liquid flow. It would be further desirable to have a pneumatically-activated pump that can deliver a more precise amount of lubricant. It would also be desirable to have an air tool lubricator that does not require a pre-filled lubricant line.

OBJECTS AND SUMMARY OF THE INVENTION

Therefore, it is an object of the present invention to provide a metering device that delivers a more precise amount of a lubricant or other liquid than prior-art devices. Another object is to provide a pneumatically-activated pump that can accommodate a removable reservoir. A further object is to provide a pneumatically-activated pump that does not require a pre-filled liquid line (e.g., lubricant line). Another object is to provide a pneumatically-activated pump that has a simplified structure for air and liquid flow. Yet another object is to provide a pump having a simplified structure and method of filling, or priming, a liquid line used with a pneumatically-activated pump, particularly an air tool lubricator.

These and other objects and advantages are achieved in a metering device or pneumatically-activated pump composed of a body having a chamber for housing a gas or inlet piston, a central bore with a liquid chamber for housing an injector piston, a threaded bore for receiving a removable reservoir for containing a liquid such as a lubricant, a chamber for housing a priming mechanism, a chamber for housing a fixture for attachment of a fluid line, and a central channel with an inlet and an outlet for a gas. The liquid chamber of the central bore is in fluid flowing relation with a priming conduit from the reservoir and the outlet of the pump. The body of the pump includes openings for receiving tubing for conducting compressed gas into and out of the central gas channel that extends through the body of the apparatus.

The pump employs an interconnected gas or inlet piston and an injector. The inlet piston is disposed within a chamber adjacent to the gas inlet leading to the central gas channel. The injector is connected to the inlet piston, and disposed within the liquid chamber of the central bore. The injector is movable in correspondence to the motion of the inlet piston. The injector operates to deliver a predetermined amount of liquid from the priming conduit into a metering chamber and into the liquid line in response to air or, more broadly, gas flow.

An evacuator valve assembly is disposed adjacent the metering chamber, and is moveable in response to forced fluid flow from the metering chamber by the action of the injector. The evacuator valve assembly assists the evacuation of fluid from the metering chamber and into an attached liquid line (e.g., lubricant line) for delivery to an air tool lubricator or other article.

The priming mechanism is mounted through another opening in the body of the pump and is operable to meter a predetermined amount of liquid from the liquid reservoir to the liquid chamber and into the attached liquid line. One end of the priming mechanism extends out of the body so that the user can regulate the flow of liquid into the liquid chamber and liquid line.

In use, the reservoir is mounted on the pump and filled with liquid through an opening after mounting. The reservoir can also be pre-filled with fluid and then mounted on the pump. The threaded bore includes an opening to a priming conduit through which liquid can be delivered from the reservoir to the liquid chamber in the central bore. Liquid is then discharged to an air tool or other article in a predetermined amount by the action of the injector. The stroke of the injector determines the amount of liquid metered and the stroke is controlled by an adjustment stem. The priming mechanism is activated to meter liquid from the reservoir and into the attached liquid line.

Advantageously, the present invention provides a pneumatically-activated pump that is structured with a liquid reservoir that can be easily disconnected and replaced with another reservoir containing the same or different liquid, as desired. The pump will also accommodate reservoirs of varying capacity but with similar sized necks that can be fitted onto the pump. In addition, the design of the pump with the priming mechanism located in the base of the pump makes it easy to grasp the pump and manually work the priming mechanism with the fingers. Another advantage is that the pump allows precision metering of very small volumes of liquid. In addition, the pump is a relatively simple design with fewer interconnecting chambers and moving components compared to other pumps. The structure of the pump is such that it can be easily assembled and disassembled for periodic cleaning and maintenance. Another advantage of the pump is that it may be used to deliver a variety of petroleum and synthetic lubricants, water and other liquids depending on the application at hand. The present pump also provides the advantage of a direct operating injector without the need for pilot valves or other associated components.

Further objects and advantages of the present invention will become more apparent from the following detailed description of the preferred embodiment taken in combination with the accompanying drawings.

BRIEF DESCRIPTION OF THE DRAWINGS

Throughout the following views, reference numerals will be used on the drawings, and the same reference numerals will be used throughout the several views and in the description to indicate same or like parts of the invention.

DESCRIPTION OF THE INVENTION

Figure 1:
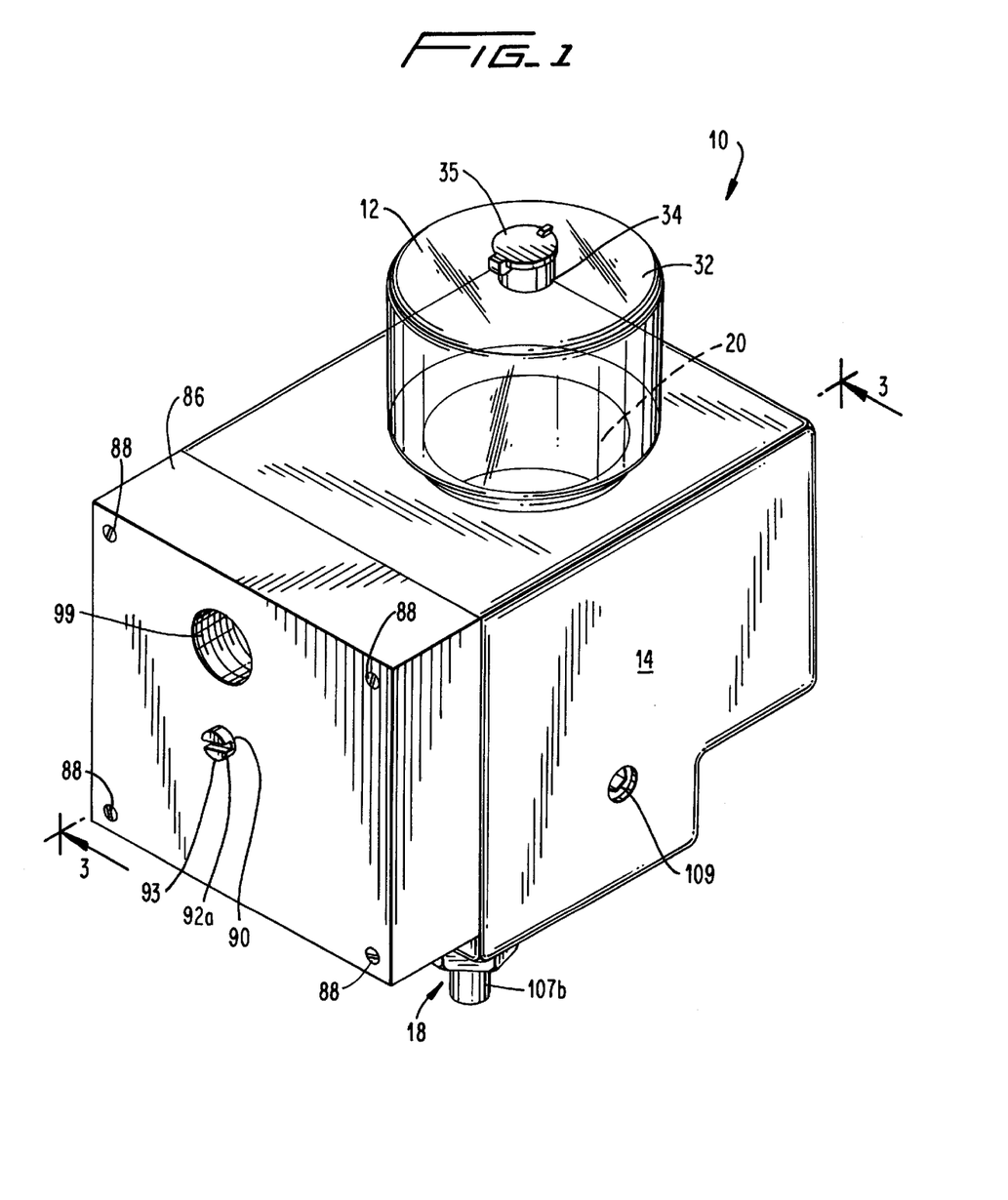
FIG. 1 is a perspective view of a pneumatically-activated pump assembly according present invention.

Referring now to the drawings, an embodiment of a pump 10, incorporating a removable reservoir 12, is shown in perspective in FIG. 1. The metering pump is pneumatically-activated to deliver a liquid to a desired location in a controlled manner.

Figure 2:
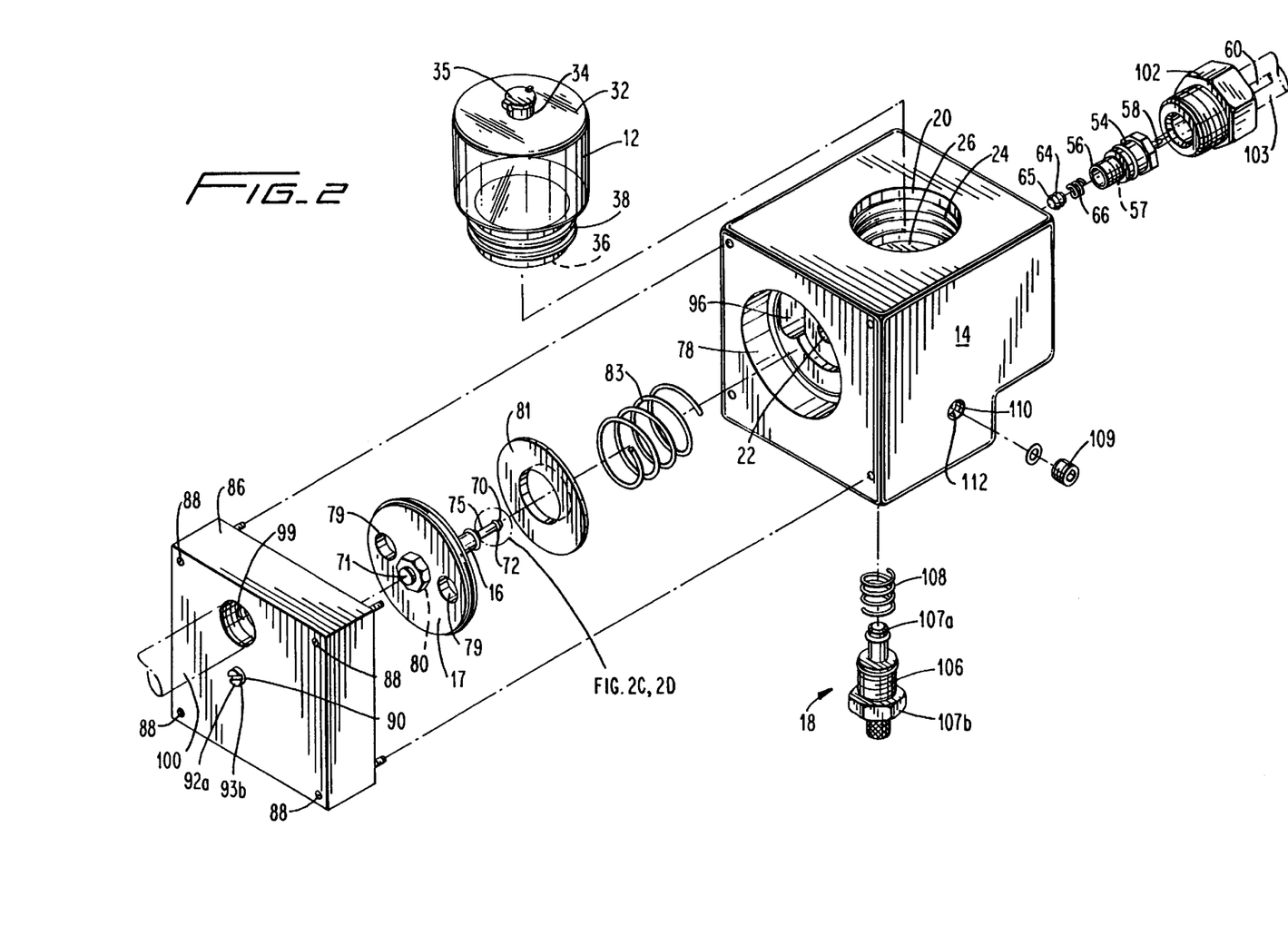
FIG. 2 is a perspective, exploded view of the pump assembly of FIG. 1.

As depicted in FIG. 1 and in exploded view in FIG. 2, the pump 10 includes a main body 14, the removable fluid reservoir 12, a horizontally positioned, slidable fluid piston or injector 16 having a gas or inlet piston 17, and a priming mechanism 18. The body 14 is composed of a number of chambers and bores for receiving and housing the various components of the pump 10, including a threaded bore 20 for receiving the liquid reservoir 12, and a central bore 22 in which the injector 16 is disposed.

The reservoir 12 may be removably coupled to the main body 14 by a number of mechanisms including a snap-fit ring (not shown) or, in the preferred manner, by the threaded bore 20. The threaded bore 20 has threaded surfaces 24 and a base portion 26. The base portion 26 of the threaded bore 20 includes an opening 28 (FIG. 4) to a priming conduit 30 that provides a fluid flowing connection between the threaded bore 20 and the central bore 22 of the main body 14. As can be seen, the reservoir 12 has a first end 32 with an opening 34 and a cap 35, an open second end 36, and a threaded portion 38 for mounting the reservoir 12 into the threaded bore 20. As shown in FIG. 2 the fluid capacity of the reservoir 12 can vary, but will typically range between about 1 ounce to about 32 ounces.

Figure 2A:
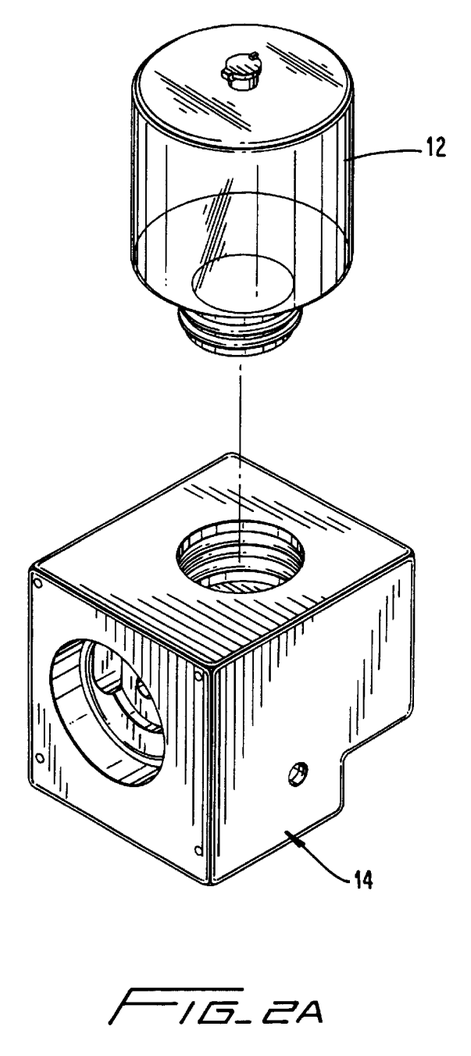
FIGS. 2A and 2B are additional embodiments of a removable reservoir that can be coupled to the main body of the pump.
Figure 2B:
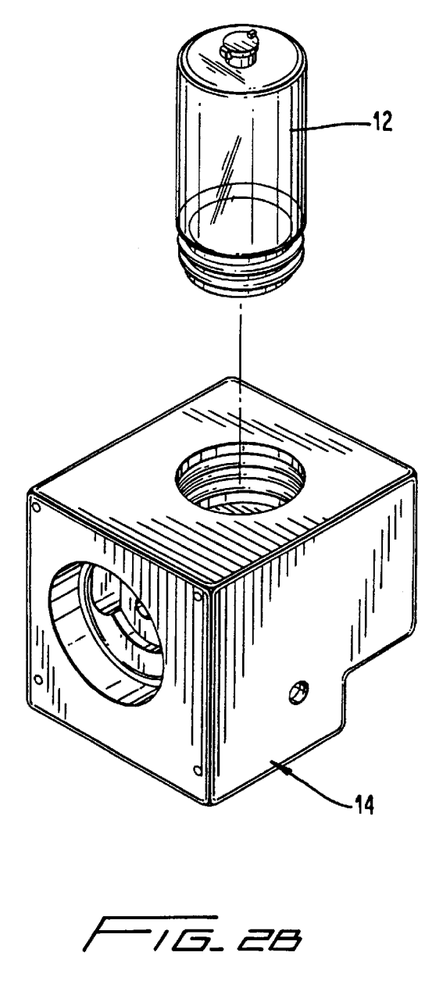

Additional embodiments of the removable reservoir 12 that are interchangeable with the main body 14 of the pump 10 are shown in FIGS. 2A and 2B.

The reservoir 12 can be mounted in the threaded bore 20, and then filled with liquid through the opening 34. A reservoir 12 that has been pre-filled with fluid through the open second end 36 can also be used by turning the pump body 14 upside down and mounting the reservoir 12 up into the threaded bore 20.

The injector 16 is positioned in a liquid chamber 40 of the central bore 22. The liquid chamber 40 has a first end 41 and a second end 42. The second end 42 is coupled in fluid flowing relationship to a metering chamber 45, which has a first end 47 and a second end 49. The second end 49 of the metering chamber 45 opens into an outlet chamber 52 in which a coupler or fitting 54 is mounted. The fitting 54 includes an open first end 56, an evacuation chamber 57, and a second end 58 that is adapted for connection to a liquid or lubricant line 60, shown as a barbed fitting.

The metering chamber 45 is in fluid flowing relation through the first end 56 of the fitting 54 with the evacuation chamber 57. The second end 49 of the metering chamber is sealed by an evacuation valve assembly 62. The evacuation valve assembly 62 has a valve head 64 composed of a plug or nut 65, and a valve spring 66 biasing the valve head 64 to close off the second end 49 of the metering chamber 45. The stroke of the injector 16 in the direction of arrow 68 and resultant fluid pressure in the metering chamber 45 displaces the valve 64 to allow liquid to be discharged from the metering chamber 45 into the evacuation chamber 57 and the liquid line 60.

Figure 3:
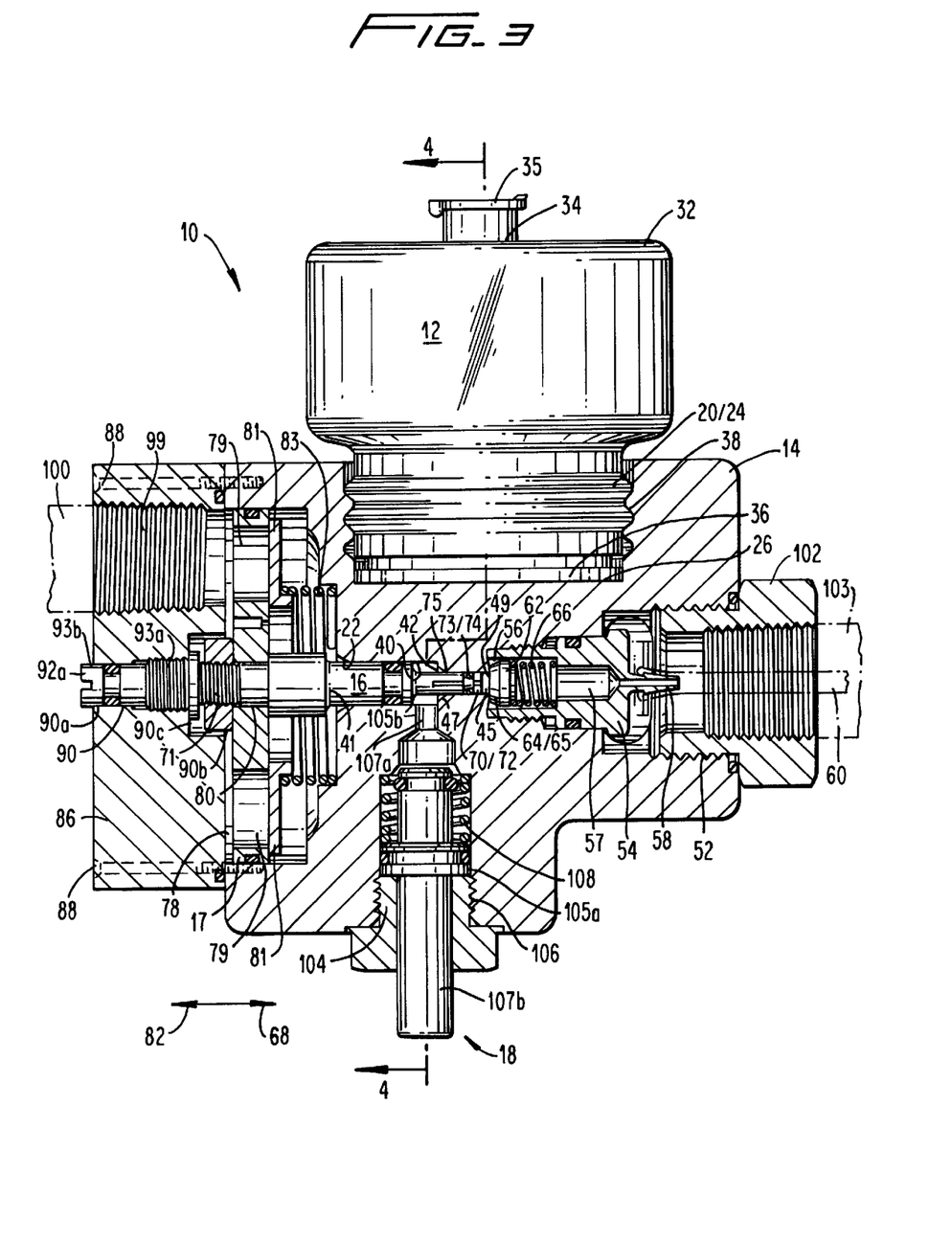
FIG. 3 is a side, elevational, cross-sectional view of the pump assembly of FIG. 1, taken along line 3—3.

The injector 16 is designed so as to ensure that no air bubbles are introduced into the liquid line 60. The piston 16 can be a dual-piston set-up such as a piston based upon one of the inventor's earlier lubricators that is disclosed in U.S. Pat. No. 4,784,584, which is hereby incorporated by reference herein. Preferably, the injector 16 is a single-piece piston design. As shown in FIG. 3, the injector 16 has first and second ends 70, 71, a head portion 72 at the first end 70 with an annular channel 73 and a sealing member 74 (e.g., O-ring) movably seated in the channel 73, and a duct 75. The duct 75 couples the liquid chamber 40 in fluid flowing relationship to the metering chamber 45.

Figure 2C:
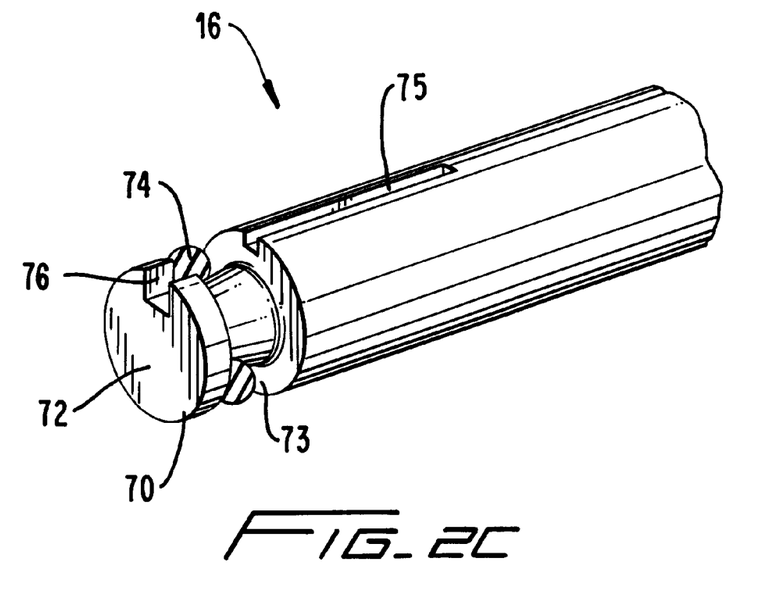
FIG. 2C is an enlarged perspective view of a portion of the piston of FIG. 2 showing a slot in the head portion.
Figure 2D:
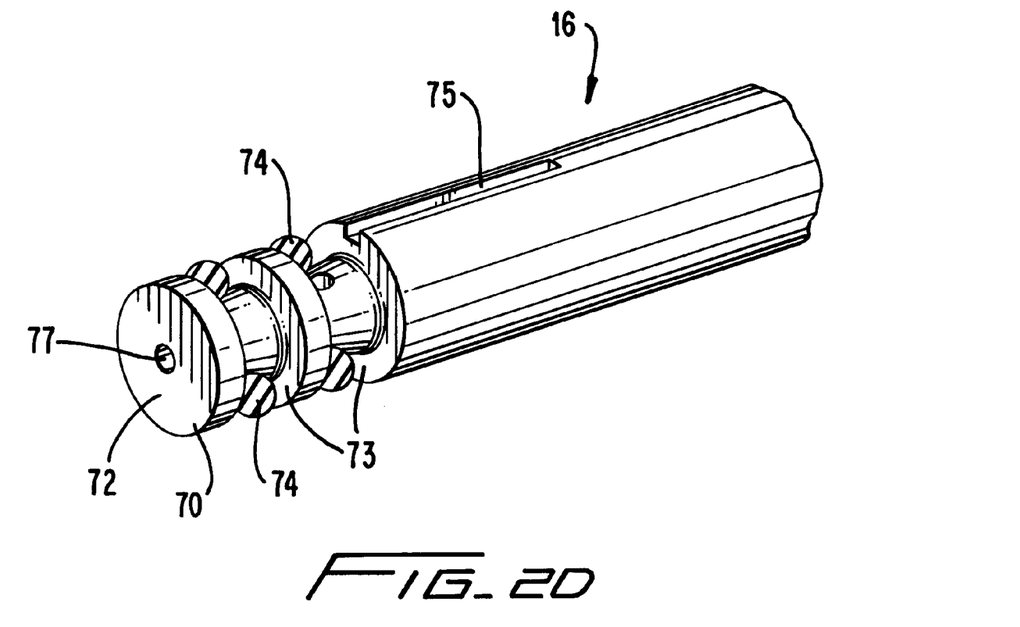
FIG. 2D is an enlarged perspective view of a portion of the piston of FIG. 2 showing a central bore in the head portion.

Lateral motion of the injector 16 within the liquid chamber 40 of the pump 10 causes the sealing member 74 to move in order to open and close the end of the duct 75 and allow intermittent flow of liquid from the liquid chamber 40 through a slot (FIG. 2C) of central bore (FIG. 2D) in the head portion 72 of the piston 16 to the metering chamber 45. Liquid is discharged in a predetermined amount from the metering chamber 45 into the evacuation chamber 57 of the fitting 54 by the stroke of the fluid piston 16. The piston allows precision metering of very small volumes of liquid (e.g., less than ⅟1000th ml per cycle) at a wide range of cycle rates (e.g., 20 cycles per second to one cycle per day).

The second end 71 of the injector 16 is coupled to the inlet piston 17 that is positioned within an inlet chamber 78. The inlet piston 17 is disc-shaped with at least one bore 79 for the passage of a gas therethrough, and a bore 80 for receiving the second end 71 of the injector 16 therethrough. The bore(s) 79 are occluded by a novel and unique feature of the present invention, a disc-shaped plate 81 which eliminates the need to have individual valves for adjusting the airflow through the bores 79. The number of bores 79 can be increased or decreased without requiring additional corresponding valves to regulate the airflow through each bore. The inlet piston 17 is biased in a first forward position in the direction of arrow 82 by a spring 83 and is movable to a second position in the direction of arrow 68.

A cover 86 maintains the spring-biased inlet piston 17 within the inlet chamber 78 and the attached injector 16 in the liquid chamber 40. As shown, the cover 86 is attachable to the pump body 14, for example, by screw members 88 or other attachment means. The cover 86 includes a bore 90 having a first end 90a, a second end 90b, and a shoulder 90c. Positioned in the bore 90 is an adjustment stem 92a which has a threaded first end 93a that is capable of contacting the second end 71 of the injector 16. The adjustment stem 92a has a second end 93b and a knob for manual adjustment of the adjustment stem 92a by the user. The adjustment stem 92a is movable within the bore 90 to calibrate the location of the injector 16 in the liquid chamber 40. Movement of the adjustment stem 92a in the direction of arrow 68 minimizes the stroke of the piston 16.

To mount the adjustment stem 92a in the cover 86, the second end 93b is inserted into the second end 90b of the bore 90, and the threaded first end 93a is threaded into the bore 90. The contact of the threaded first end 93a with the shoulder 90c prevents removal of the adjustment stem 92a through the first end 90a of the bore 90. This prevents inadvertent loss of the stem 92a from the device.

Figure 7:
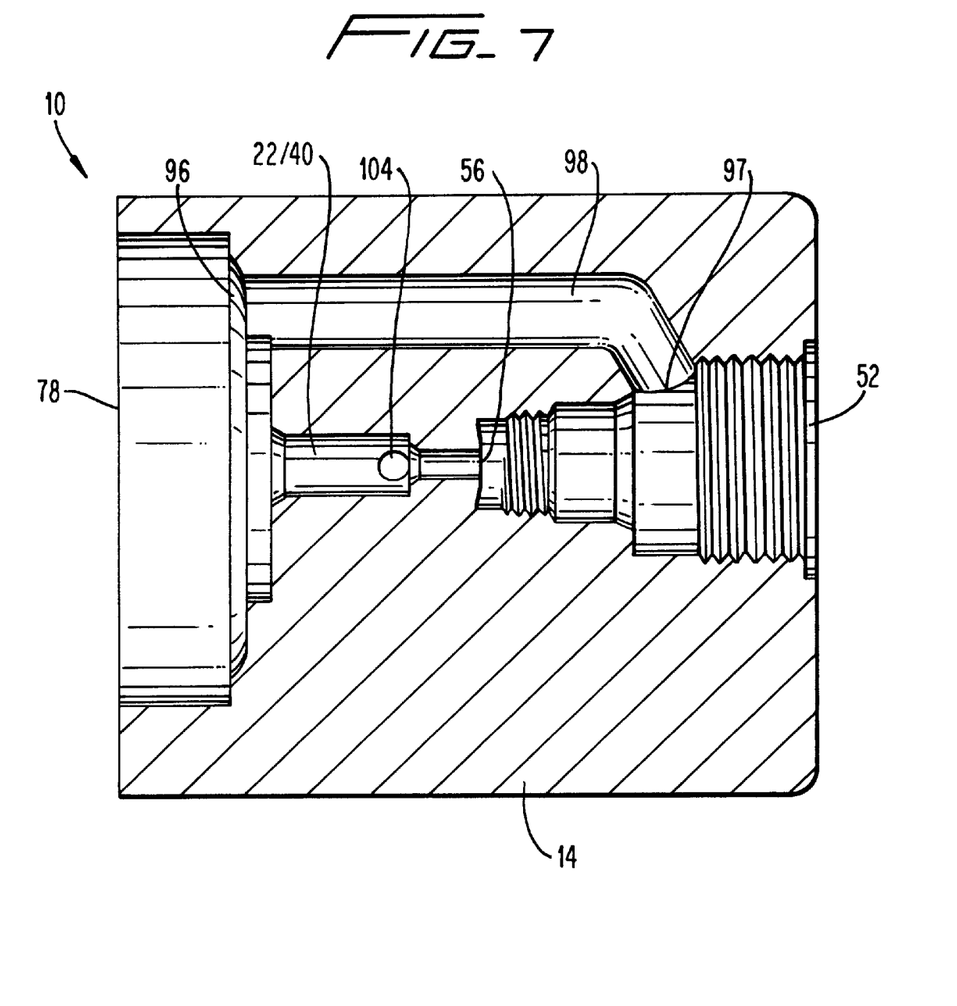
FIG. 7 is a top cross-sectional view of the pump body of FIG. 5, taken along lines 7—7, showing the central air channel.

As best seen by reference to FIG. 7, the body 14 also includes a gas inlet opening 96 in the inlet chamber 78, a gas outlet opening 97 in the outlet chamber 52, and a gas channel 98 disposed thereinbetween. The cover 86 includes an opening 99 that is adapted for receiving a tubing 100 for conducting compressed gas into the gas channel 98. The outlet chamber 52 is adapted for receiving a fitting or coupler 102 for connection to a gas line or hose 103 for conducting the gas to a machine, tool or other article.

The spring-biased priming mechanism 18 is mounted within a chamber 104 of the main body 14. As can be seen in FIGS. 2–3, the priming mechanism 18 has a threaded portion 106, a first end 107a that is retractably disposed within the central bore 22, and a second end 107b that extends out of the main body 14 to enable the user to adjust the flow of liquid from the reservoir 12 into the liquid chamber 40, and a spring 108. The priming mechanism 18 is removably inserted into the chamber 104. The primer 18 operates to meter a predetermined amount of liquid from the reservoir 12 into the central bore 22 and the liquid chamber 40, and through the evacuation valve 62 into the attached liquid line 60. In one embodiment of the invention, about 0.01 inches$^3$ of liquid is displaced each time the priming mechanism 18 is pumped. However, the sizing of the priming mechanism and, therefore, the volume of liquid displaced may vary according to the application at hand.

Figure 4:
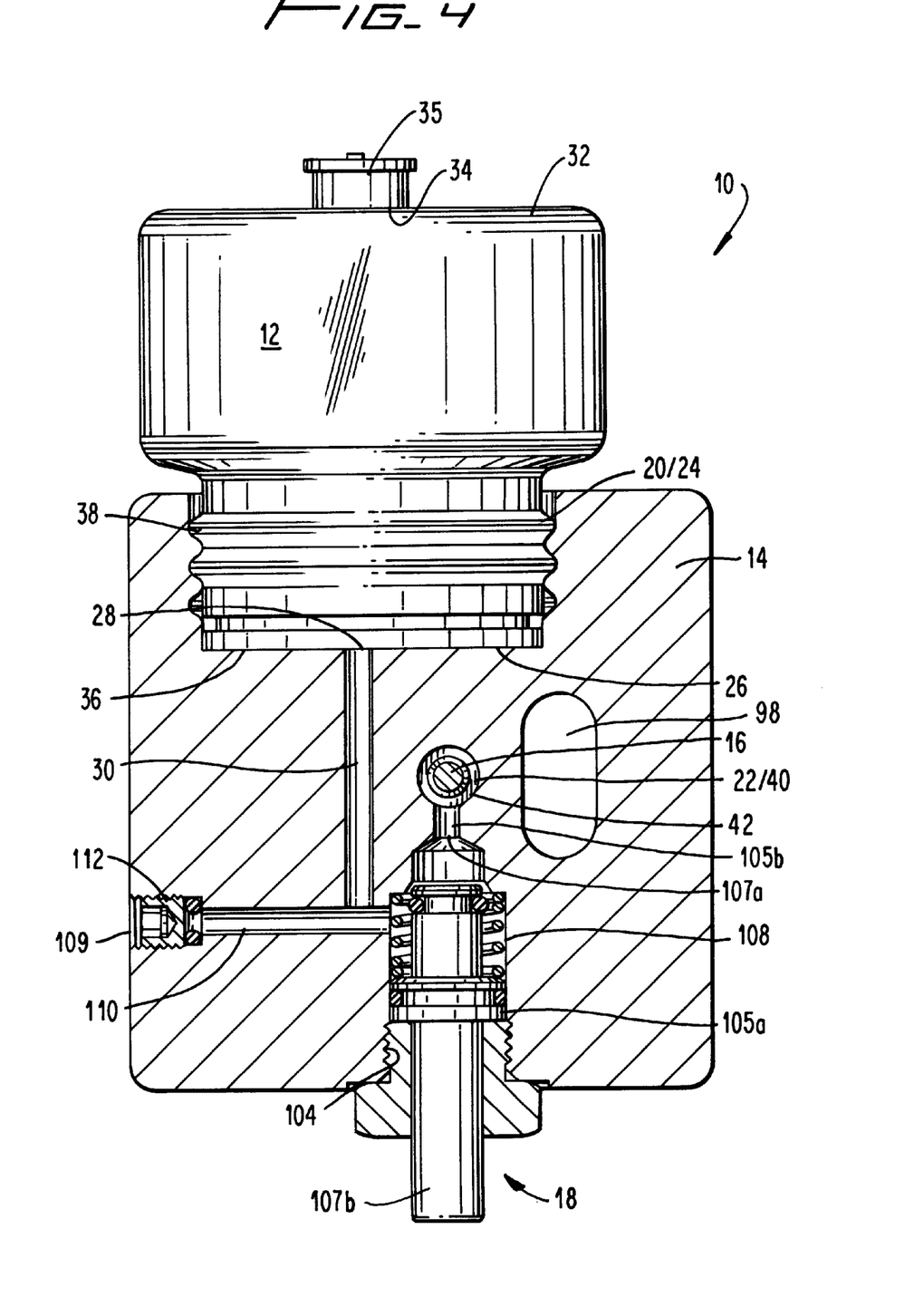
FIG. 4 is an end, elevational, cross-sectional view of the pump assembly of FIG. 1, taken along line 4—4.
Figure 5:
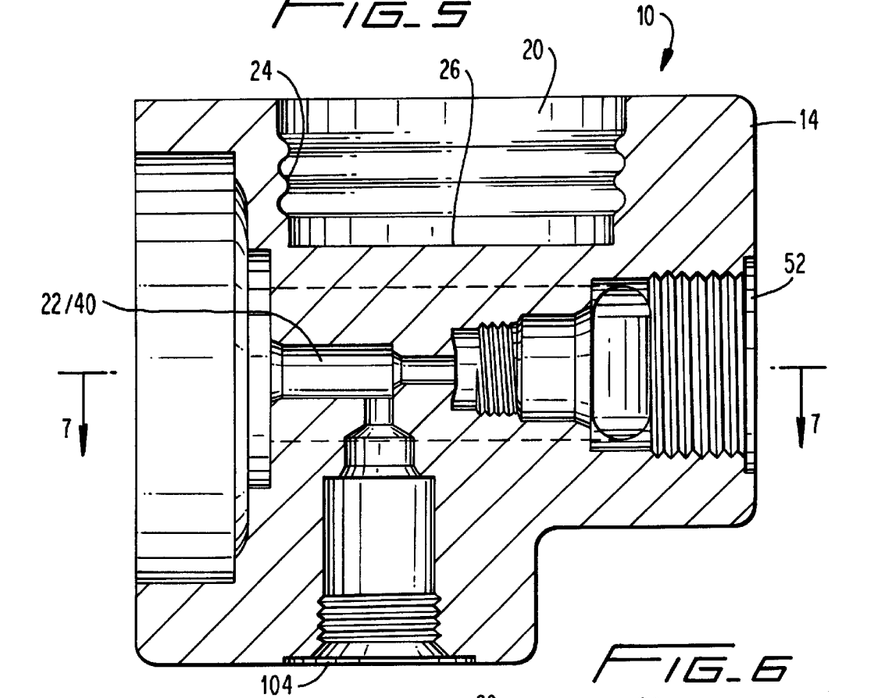
FIG. 5 is a side, elevational, partial cross-sectional view of the pump body of FIG. 3.
Figure 6:
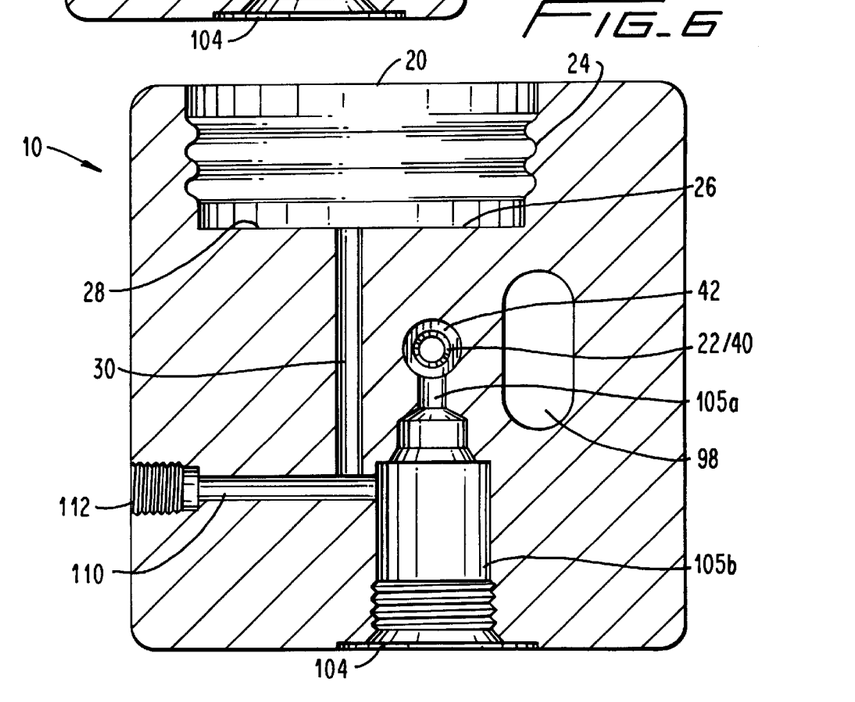
FIG. 6 is an end, elevational, partial cross-sectional view of the pump body of FIG. 4.

As shown in FIGS. 4 and 6, a channel 110 is provided in the main body 14 to provide a connection between the priming conduit 30 and the liquid chamber 40. A set screw 109 is mounted on the main body 14 to close the end 112 of the channel 110.

Operation

When properly disposed between a source of compressed gas and an air tool or other article, the pump 10 of the present invention delivers a precise amount of liquid such as a lubricant to an object of interest. For purposes of an example, the operation of a pump 10 in the form of an air tool lubricator will be described.

Before the air tool lubricator 10 is operated, the liquid or lubricant line 60 and the liquid chamber 40 are pre-filled with lubricant. The removable reservoir 12 is mounted on the main body 14, and the reservoir is filled with a lubricant.

The liquid chamber 40 is filled with lubricant from the reservoir 12 by gravity and by the suction force of the horizontally positioned, slidable injector 16. Lubricant flows from the reservoir 12 through the priming conduit 30 to the liquid chamber 40. In order to pre-fill the lubricant line 60, the priming mechanism 18 is activated. It may be activated manually, for example, by an operator's finger or thumb. The priming mechanism 18 moves from the first portion 105a of the chamber 104 to the second portion 105b, thereby forcing liquid lubricant from the priming conduit 30 into the second end 42 of the liquid chamber 40. With the injector 16 in its original position in the direction of arrow 82 (FIG. 3), fluid flows from the liquid chamber 40 through the duct 75 of the injector 16 into the annular channel 73, and out the head portion 72 to the metering chamber 45.

The flow pressure of the lubricant forces the evacuation valve 62 to open and lubricant flows from the metering chamber 45 into the evacuation chamber 57 to the lubricant line 60. The provision of a priming mechanism 18 permits air tools to be coupled to supply lines that are not pre-filled. For typical lubricant lines, about 5–10 seconds of priming is sufficient to fill the lubricant line 60.

Once the lubricant line 60 is filled with lubricant, the pump 10 is coupled in a gas tube 100 and a gas line 103 between a source of compressed air and an air tool (not shown), respectively. Air flow through the pump 10 is turned on and off by activation of the air tool (not shown). When the air tool is activated, air flows into the pump 10 through the tubing 100 and is directed to the inlet piston 17. The air flow causes the air pressure on the right hand side of the inlet piston 17 to drop. The pressure differential causes the inlet piston 17 to move a predetermined amount forward. Typically, the pressure differential is about 5 psi. Simultaneously, the air flow is directed to the disc-shaped plate 81 which is biased to occlude the openings 79. Air flow force eventually overcomes the biasing force of the spring 83 thereby, allowing air to flow into the air channel 98 of the main body 14. The air flow into air channel 98 can be adjusted by increasing or decreasing the number of bores 79 that are provided in the inlet piston 17.

As the inlet piston 17 and the injector 16 move a predetermined distance forward in the direction of arrow 68, fluid pressure at the head 72 of the injector 16 increases, thereby forcing the evacuation valve 62 to open. When the evacuation valve opens, a measured volume of liquid flows out of the metering chamber 45. The pistons 16, 17 continue to move forward to a third position (not shown) in the direction of arrow 68, and push all of the liquid out of the metering chamber 45. The head 72 extends out of the metering chamber 45 a distance called the kickoff amount, ejecting all of the liquid located forward of the injector 16 out of the metering chamber 45. Typically, the kickoff amount is about 0.005 of an inch.

At the third position (not shown), the injector 16 physically contacts the evacuation valve head 62 creating a differential pressure. This action causes any air bubbles and any impurities in the lubricant to be flushed out of the metering chamber 45. The air bubbles and impurities are carried downstream into the lubricant line 60 during each cycle. As long as the air tool is in operation, the pistons 16 and 17 remain in the direction of arrow 68.

At the end of the cycle, the evacuation valve 62 is closed by the force applied by its biasing spring, air flow to the air tool stops, and the inlet piston 17 and attached injector 16 move back to their original position (in the direction of arrow 82). As the injector 16 moves rearward in the direction of arrow 82, the sealing member 74 in the annular channel 73 unblocks the duct 75, allowing liquid to flow from the liquid chamber 40 into the annular channel 73 to the metering, chamber 45 at the head 72 of the fluid piston 16. When air flows again, the cycle is repeated.

The present invention offers many advantages by providing a simplified design. As compared to the device shown in Applicant's co-pending application Ser. No. 08/514,967, the present invention eliminates the need for multiple spring valves used to control air flow through and the motion of the gas piston or inlet piston 17. Two or more openings may be provided in the inlet piston 17, but only one disc-shaped plate 81 is needed to control air flow through them, whereas in prior designs each opening had its own valve.

In addition, the present invention offers advantages in using only a single channel for carrying gas, gas channel 98. The single gas channel 98 is aligned adjacent to and substantially parallel to the central bore 22, although at least one end of the gas channel curves and is not parallel to the central bore 22. As can be appreciated, the fewer bores, chambers, and components that are needed in any lubricant pump, the better, because each additional bore, chamber, or component adds cost to the finished device.

While the present invention has been described in what is believed to be the most preferred form, it is to be understood that the invention is not confined to the particular construction and arrangement of the components herein illustrated and described, but embraces such modified forms thereof as come within the scope of the following claims.

What is claimed is:

1. A device for metering a liquid, comprising:
   a) a body having
      an inlet chamber and an outlet chamber;
      a central bore with a metering chamber having an end disposed in the outlet chamber;
      a central channel with an inlet and an outlet for a gas;
      a bore for receiving a removable reservoir for containing a liquid, the bore having surfaces and a base with an opening; and
      a priming conduit in fluid flowing relation with the opening in the base of the threaded bore and the liquid chamber of the central bore;
   b) a gas piston disposed within the inlet chamber adjacent to the inlet of the central channel; and
   c) an injector connected to the gas piston, and disposed within the metering chamber; the injector movable in correspondence to the motion of the gas piston, adapted for delivering a predetermined amount of liquid into the metering chamber and into a liquid line disposed in the outlet chamber, and responsive to air flow.

2. The liquid metering device according to claim 1, further comprising: a removable reservoir mounted in the bore for receiving the removable reservoir.

3. The liquid metering device according to claim 2, wherein the reservoir includes an opening for receiving liquid therethrough into the reservoir.

4. The liquid metering device according to claim 2, wherein the reservoir is pre-filled with liquid.

5. The liquid metering device according to claim 1, further comprising:
   a priming mechanism mounted in a chamber of the body, and adapted for filling a liquid line disposed in the outlet chamber with liquid from the reservoir.

6. The liquid metering device according to claim 1, wherein the injector is axially slidable from a first position, through a second position, to a third position.

7. The liquid metering device according to claim 1, wherein the injector comprises a single piece piston with first and second ends, the first end including a head portion and a circumferentially disposed annular channel with a sealing member movably seated therein; a means for conducting liquid from the annular channel to the head portion; and a longitudinally-disposed duct with first and second ends, the first end in fluid-flowing relation with the annular channel and the second end in fluid-flowing relation with the liquid chamber;
   wherein lateral motion of the single-piece piston within the liquid chamber of the pump causes the sealing member to move to open and close the first end of the duct and allow intermittent fluid communication between the duct, the annular channel, and the head portion of the single-piece piston.

8. The liquid metering device according to claim 7, wherein the means for conducting liquid from the channel to the head portion of the piston is a slot providing a fluid flowing connection between the annular channel and the head portion.

9. The liquid metering device according to claim 7, wherein the means for conducting liquid from the channel to the head portion of the piston is a central bore with a fluid flowing connection to a passageway having an opening into the annular channel.

10. The liquid metering device according to claim 1, wherein the gas piston comprises a disc member having a bore therethrough for passage of the gas, a plate member for occluding the bore, and a spring member.

11. The liquid metering device according to claim 1, further comprising: a cover for maintaining the gas piston in the gas inlet chamber; the cover having a bore therethrough for passage of the gas.

12. The liquid metering device according to claim 1, further comprising: at least one of a member for coupling the liquid line to the pump, and a member for coupling an air hose to the pump; said members adapted for being mounted in the outlet chamber of the pump.

13. The liquid metering device according to claim 1, further comprising an adjustment stem mounted on the body and operable to move the injector along a longitudinal axis.

14. The liquid metering device according to claim 1, further comprising:
    an evacuation chamber having an opening positioned in fluid flowing relation adjacent to the metering chamber; and
    means for sealing the opening of the evacuation chamber.

15. A liquid metering device comprising:
    a body having an inlet chamber and an outlet chamber;
    a central bore with a metering chamber that is positioned between the inlet chamber and the outlet chamber;
    a single central channel for carrying a gas, aligned substantially parallel to the central bore, and having an inlet and an outlet;
    a mechanism for coupling a removable reservoir to the body;
    a priming conduit in fluid flowing relation with the mechanism for coupling a removable reservoir to the body;
    a gas piston disposed within the inlet chamber having at least one bore;
    a disc-shaped plate for controlling gas flow through the bore in the gas piston; and
    an injector piston coupled to the gas piston and disposed within the metering chamber, the injector piston movable in correspondence to the motion of the gas piston, adapted for delivering a predetermined amount of liquid into the metering chamber and into a liquid line disposed in the outlet chamber, and directly responsive to air flow.

16. The liquid metering according to claim 15, wherein the disc-shaped plate and the gas piston are biased in a first position by a single biasing means.

17. A device for metering a liquid, comprising:
    a body having an inlet chamber and an outlet chamber;
    a central bore with a metering chamber that is positioned between the inlet chamber and outlet chamber;
    a central channel with an inlet and an outlet for a gas;
    a mechanism for coupling a removable reservoir to the body;
    a priming conduit in fluid flowing relation with the mechanism for coupling a removable reservoir to the body;
    a gas piston disposed within the inlet chamber; and
    an injector piston coupled to the gas piston and disposed within the metering chamber, the injector piston movable in correspondence to the motion of the gas piston, adapted for delivering a predetermined amount of liquid into the metering chamber and into a liquid line disposed in the outlet chamber, and directly responsive to air flow.

18. A device for metering a liquid, comprising:
    a body having an inlet chamber and an outlet chamber;
    a central bore with a metering chamber that is positioned between the inlet chamber and outlet chamber;
    a member for coupling a removable reservoir to the body, and adapted for receiving and interchanging a plurality of removable and different sized reservoirs, the coupling member being a chamber having surfaces and a base with an opening;
    a priming conduit in fluid flowing relation with the opening in the base of the coupling member and the metering chamber of the central bore; and
    an injector piston disposed within the metering chamber for delivering a predetermined amount of liquid into the metering chamber and into a liquid line disposed in the outlet chamber.

19. The device according to claim 18, wherein the surfaces of the chamber and the reservoirs are matingly ribbed for mounting the reservoir in the chamber.

20. A method of delivering a liquid to an object, the method comprising the steps of:
    providing a device for metering a liquid, the device being composed of: a body with an inlet chamber and an outlet chamber; a central bore with a metering chamber positioned between the inlet chamber and outlet chamber; a central channel with an inlet and an outlet for a gas; a mechanism for coupling a reservoir to the body; a priming conduit in fluid flowing relation with the coupling mechanism; a gas piston disposed within the inlet chamber and coupled to an injector piston that is disposed within the metering chamber; the injector piston movable in correspondence to the motion of the gas piston, adapted for delivering a predetermined amount of liquid into the metering chamber and into a liquid line disposed in the outlet chamber, and directly responsive to air flow; and a priming mechanism mounted in the body with a first end in contact with the central bore to control liquid flow from the priming conduit into a liquid line mounted in the body;
    coupling a liquid reservoir for holding the liquid to the body of the liquid metering device;
    mounting a liquid line in the body of the liquid metering device, in fluid flowing relation with the metering chamber; the liquid line for delivering liquid to the object;
    attaching a gas line for supplying gas to the liquid metering device, to the gas inlet of the body;
    activating the priming mechanism to fill the liquid line with liquid; and
    activating air flow through the gas line into the liquid metering device to effectuate movement of the gas piston and the injector piston whereby liquid is delivered into the liquid line and to the object.

21. The method of claim 20, wherein the liquid metering device includes a member for adjusting the stroke of the injector piston, and the method further comprises the step of adjusting the adjustment member to vary the stroke of the injector piston.

22. The method of claim 20, wherein the coupling step comprises mounting a removable reservoir in a bore in the body of the liquid metering device.

23. The method of claim 22, further comprising the step of: placing the liquid into the reservoir.

24. A method of delivering a liquid to an object, the method comprising the steps of:

providing a device for metering a liquid, the device being composed of: a body with an inlet chamber and an outlet chamber; a central bore with a metering chamber positioned between the inlet chamber and outlet chamber; a central channel with an inlet and an outlet for a gas; a mechanism for coupling a reservoir to the body; a priming conduit in fluid flowing relation with the coupling mechanism; a gas piston disposed within the inlet chamber and coupled to an injector piston that is disposed within the metering chamber; the injector piston movable in correspondence to the motion of the gas piston, adapted for delivering a predetermined amount of liquid into the metering chamber and into a liquid line disposed in the outlet chamber, and directly responsive to air flow;

coupling a liquid reservoir for holding the liquid to the body of the liquid metering device;

mounting a liquid line in the body of the liquid metering device, in fluid flowing relation with the metering chamber; the liquid line for delivering liquid to the object;

attaching a gas line for supplying gas to the liquid metering device, to the gas inlet of the body; and activating air flow through the gas line into the liquid metering device to effectuate movement of the gas piston and the injector whereby liquid is delivered into the liquid line and to the object; with less than about $\frac{1}{1000}$th ml liquid being delivered to the object.

25. The method of claim 24, wherein the liquid metering device includes a member for adjusting the stroke of the injector piston, and the method further comprises the step of adjusting the adjustment member to vary the stroke of the injector piston.

* * * * *